Aug. 8, 1961 W. M. ALLEN ET AL 2,995,449
METHOD FOR MANUFACTURING SKINLESS SAUSAGES
Filed Jan. 29, 1958 3 Sheets-Sheet 1

INVENTOR
WILLIAM M. ALLEN
HERMAN NACK

BY *Gray, Mase & Dunson*

ATTORNEY

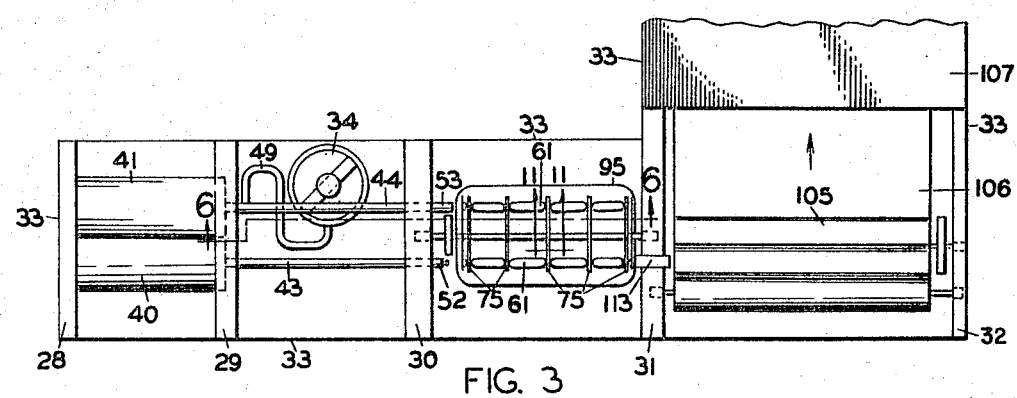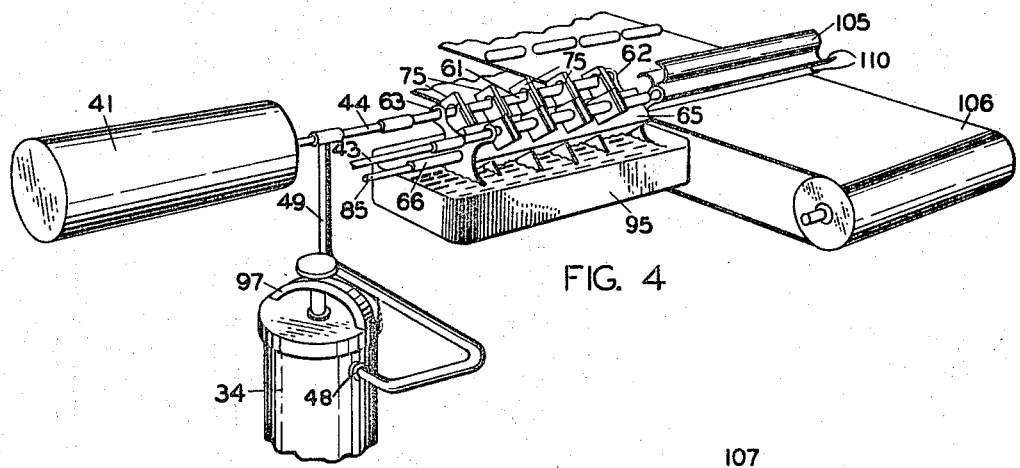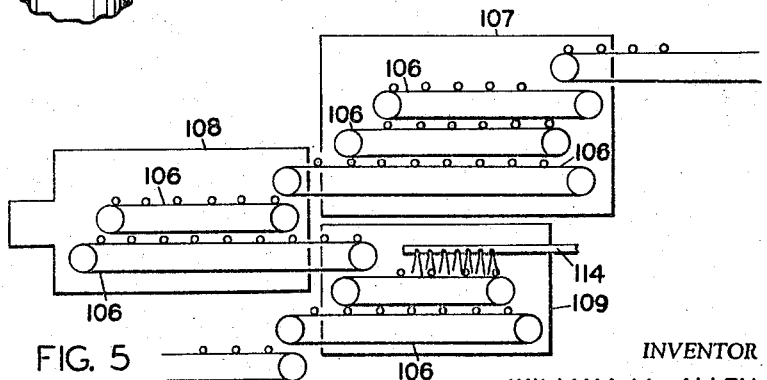

Aug. 8, 1961   W. M. ALLEN ET AL   2,995,449
METHOD FOR MANUFACTURING SKINLESS SAUSAGES
Filed Jan. 29, 1958   3 Sheets-Sheet 3

INVENTOR
WILLIAM M. ALLEN
HERMAN NACK

BY *Gray, More, & Dunson*

ATTORNEY

United States Patent Office 2,995,449
Patented Aug. 8, 1961

2,995,449
METHOD FOR MANUFACTURING SKINLESS SAUSAGES
William M. Allen and Herman Nack, Columbus, Ohio, assignors, by mesne assignments, to Frank Research Corporation, Canton, Ohio, a corporation of Ohio
Filed Jan. 29, 1958, Ser. No. 711,983
5 Claims. (Cl. 99—109)

The present invention relates to a method of manufacturing meat products. More particularly, it relates to a method and apparatus for making meat products conventionally known as skinless sausages.

The conventional method of making sausages, and the one still most commonly used by manufacturers, is that in which the comminuted meat-containing mixture is stuffed into a tubular casing and cooked therein. After cooking and other processing is completed, the casing is removed from the sausages. Although there are many variations in detail in the process steps of making skinless sausages, a typical process is as follows:

The comminuted meat mixture is forced from a cylinder under pressure through an outlet known as a stuffing horn. The rate of discharge from the horn is controlled by the pressure on a piston that acts on the meat mixture in the cylinder and by a valve at the horn. An operator guides the mixture into a tubular casing which has been previously folded in accordionlike fashion over the horn. As the mixture issues from the horn, the operator gradually pays out the casing, controlling the rate of operation by manual dexterity and skill. The density to which the mixture is stuffed into the casing depends upon the rate at which the operator allows the mixture to eject from the horn and the rate at which he releases the casing. Another factor affecting the uniformity of stuffing is the ability of the operator to guide the casing from the horn concentrically with the central axis of tthe horn. If the operator allows the casing to become eccentrically disposed with respect to the horn during its travel, and during the loading operation, the density of the mixture will not be uniform in the casing, and air bubbles may collect in pockets therein.

After a length of casing has been stuffed, the end of the tubing is tied off. The forward end of the stuffed casing is then fed through a tying machine which gathers and ties the casing tightly together at predetermined intervals along its length. This is ordinarily done by means of twine wrapped around the casing and held by friction. After the casing has been linked in this manner, the entire stuffed unit is placed on conveying means, where, in conjunction with other stuffed casings, it is transmitted into a smokehouse or oven for smoking and cooking. A batch may be held for as long as an hour before enough sausages are accumulated to fill a smokehouse for a typical production run.

A typical process in a smokehouse involves keeping the sausages under smoked conditions at a temperature of 130° F. for about an hour. This may be conveniently seen in graphical form in FIG. 1 in which the dashed line depicts the normal processing of frankfurters by the conventional method. Following the smoke oven, stage 1, the temperature is raised to 150° F. in a usually smokeless atmosphere, stage 2, for about an hour. Following this, the temperature is raised to 175° F. for another hour in stage 3, making a total of 3 hours' time in the smokehouse.

After the cooking operation, the racks are withdrawn and the sausages in the casings are subjected to a 5-minute plumping treatment in the presence of steam (on the racks), in stage 4. This 5-minute plumping treatment causes the sausages to swell and round out. After this, the casing is sprayed with cold water until the sausage temperature is reduced to about 100° F. in stage 5, following which they are refrigerated for about 12 hours or more at about 40° F. in stage 6. The refrigeration time may vary according to the convenience of the production schedule.

After refrigeration, the casings are removed from the racks by operators who feed them into machines to strip the casings in step 7, leaving the individually formed sausages. The casings are disposed of as waste. The individual sausages are then packed, followed by further refrigeration and shipping.

This invention relates to a new process for making skinless sausages in which the manufacturing time is reduced from about 16 hours, as depicted in the typical process described above, to about one-half hour or less (see FIGURE 1) and which apparatus is provided to manufacture sausages at this faster rate.

Briefly, the method of this invention comprises: forming and coagulating the mixture in stage 1; cooking the sausage in a humid atmosphere without casing or skin formation in stage 2, followed by smoking the sausage in a smoke-laden atmosphere at a reduced temperature and at reduced humidity in the atmosphere in stage 3; and cooling the sausage to storage temperature in stage 4.

The apparatus of this invention comprises: a frame; a flexible tubular mold which is supported on the frame; stuffing means which is also supported on the frame in alignment with the mold for forcing the mixture into the mold; gathering means mounted on the frame at and around the tubular mold at spaced positions along the length thereof, which is movable to a closed position for closing about and gathering the mold together to divide the mixture into discrete portions, and which is retractable to open position for releasing the mold to return to tubular form; heating means on the frame adjacent to the mold for heating the mixture a first interval of time to coagulate the mixture to a form-sustaining consistency adjacent to the surface, which is operable while the mold-gathering means is moved to closed position; and expelling means supported on the frame in alignment with the mold to force the discrete form-sustaining sausages from the mold.

It will be seen that in the apparatus, the comminuted mixture is forced into a flexible mold which is held at both ends. With the mixture in place, the flexible tubular mold is gathered at intervals to separate the mixture into discrete sausage formations. While separated the mixture is subjected to heat long enough to coagulate the mixture to a self-sustaining consistency. At this time, the gathering means is released from the mold and means is provided to push through the mold and eject the discrete formed sausages from the mold. The sausages are conveyed into an oven where they are cooked without skins or casings in a highly humid atmosphere for a short period of time. It has been found that cooking the sausages in a highly humid atmosphere for a short period of time is adequate to accomplish the purposes of cooking that are required. Smoke may be introduced into the atmosphere for the purpose of introducing flavor into the sausages during the cooking process. It has been found that the sausages receive and retain the smoke at a much faster rate when cooked without skin formations or casings. The sausages are conveyed from the smoke oven to chilling apparatus where one of several means may be used to rapidly reduce the temperature of the sausage to refrigeration temperature.

The forming and coagulating step in the process, described above, preferably comprises: stuffing a flexible mold with a comminuted mixture; gathering the mold tightly together at spaced positions to divide the mixture into at least one discrete sausage form; applying heat to the mixture for a period of time sufficient to coagulate the mixture adjacent to the surface of the sausage to a form-sustaining consistency, releasing the mold at the gathered positions; and expelling the sausage from the mold.

The method of this invention has been carried out in the apparatus disclosed and has been found to provide sausages comparable in taste, color, and meat condition to those manufactured by the typical conventional process previously described. The process and apparatus of this invention provide many improvements and advantages over the prior conventional practices. Specifically, this invention has the following purposes and features:

It is a purpose of this invention to provide an improved method of manufacturing sausages. It is another purpose to provide an improved process useful in a continuous manufacturing process of producing sausages. It is an object to provide a sausage-manufacturing process in which the sausages are formed in a continuous, reusable, flexible tubular mold. It is yet another purpose to provide a process which reduces sausage manufacturing time to about one-half hour, more or less.

A purpose of this invention is to provide improved means and apparatus for chilling sausages after cooking in a manufacturing process. It is still another object to provide means for sizing, curing, and smoothing the surface of sausages as a final step in sausage-manufacturing processes.

Features of the present invention include: the way in which casing waste is eliminated in sausage manufacturing; the way in which hand operations are reduced in sausage manufacturing; the way in which processing time and manufacturing costs are reduced in sausage manufacturing; the way in which the chance of contamination is reduced in sausage manufacturing; and the way in which internal bacteria growth during cooking is reduced in sausage manufacturing.

In addition, features of the invention include: a way in which a more uniform sausage product is produced by the elimination of manual operations; the way in which a smoke taste is more effectively imparted to a finished sausage product; the way in which space and equipment size are reduced for sausage manufacturing processes; the way in which cooked sausages are chilled, smoothed, and sized by rolling the sausages on a cold surface or, in the alternative, by forcing the sausages longitudinally through a converging tapering tube which is at reduced temperature.

This invention comprises a method and apparatus of applying the same, the preferred form of which is disclosed in the following description and attached drawings. Although the apparatus, structure, and method described and shown in detail refer with particularity to the manufacture of skinless sausages of the frankfurter variety, it is apparent that this invention should not be limited thereto. Many of the significant details of this invention apply with equal qualification to any link sausage manufacturing operation.

In the drawings:

FIG. 3 is a plan view of a portion of the apparatus;

FIG. 4 is a perspective view of portions of the apparatus;

FIG. 5 is a schematic side elevational view of other portions of the apparatus;

For convenience of discussion, the apparatus of this invention is divided into two main portions, the first of which is the forming and coagulating portion and the latter of which is the cooking and further processing portion.

*Forming and coagulating portion*

Figure 2:
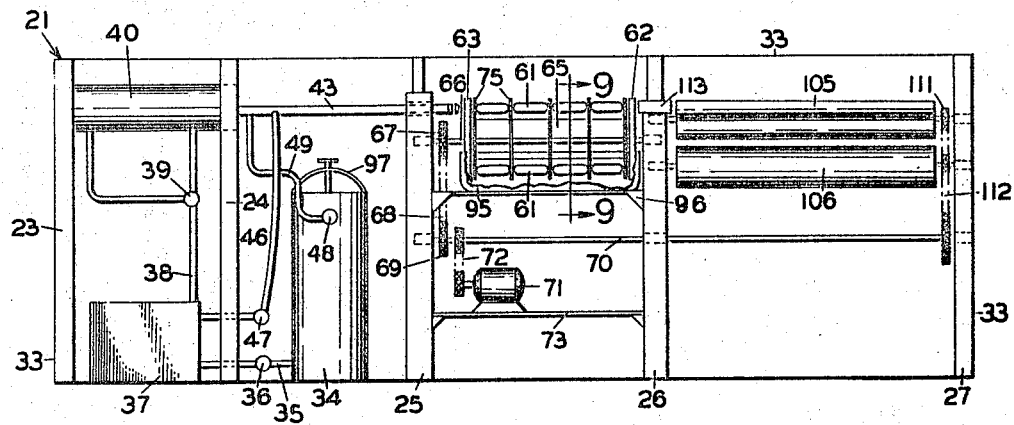
FIG. 2 is a schematic side elevational view of the apparatus capable of being used to carry out the method.

Referring to FIGS. 2 and 3, the frame of the apparatus of this invention, designated generally as 21, comprises vertical support members 23, 24, 25, 26, and 27, connected to horizontal support members 28, 29, 30, 31, and 32, respectively. The frame 21 is suitably encased in a housing 33 on all sides. Housing 33 may be provided with doors at suitable positions for attendance to the functions of the machine.

In the first portion, a stuffer 34, which may be of conventional design, is connected by a suitable conduit 35 and control valve 36 to a source of compressed air 37. Compressed air source 37, which may be a conventional compressor and accumulator, is connected by suitable conduits 38 and valves 39, to a pair of double-acting cylinders 40 and 41. Each cylinder 40 and 41 contains a piston which operates, in reciprocation, rods 43 and 44, respectively.

Ejector rod 43 is hollow, having an internal chamber 45 (FIG. 8) which is connected by means of a flexible conduit 46 through a valve 47 to the compressed air source 37.

An outlet and valve 48 of the stuffer 34 is connected by means of a flexible conduit 49 to the hollow of stuffing rod 44. Stuffing rod 44 and ejector rod 43 are supported at their projected ends 52 and 53, respectively, by suitable bearings in support member 30. In the apparatus described above, operation of the valve 39 that is connected to cylinder 40 causes ejector rod 43 to move laterally in its bearings in one direction. Operation of the valve 39 to the opposite position causes the piston rod ejector 43 to return to the position shown. In a like manner, operation of the valve 39 which is connected to cylinder 41 causes the reciprocation of stuffing rod 44 to extended position and return.

During the operation of ejector rod 43, air may be admitted to the inner chamber 45 by means of the operation of valve 47. In a like manner, operation of valves 36 and 48 causes a material that has been previously loaded into the stuffer 34 to be forced through conduit 49 into the hollow of stuffing rod 44.

The remainder of the forming and coagulating portion of the apparatus is a horizontally rotatable molding unit, designated generally as 60. Unit 60 comprises a plurality of four equally spaced molding stations (the number of stations being a matter of choice although four are shown). Each molding station comprises a flexible molding tube 61 which is supported in vertically disposed stanchions 62 and 63 at oppositely positioned entrances and exit ends, respectively. Stanchions 62 and 63 are fastened at the ends of a rotatable support member 65. Support member 65 is concentrically positioned on outer stub shafts 66 at each end. Stub shafts 66 are suitably rotatably supported in frame members 30 and 31. At one end, stub shaft 66 carries a sprocket 67 on which is carried a chain 68 that is drivingly meshed with a sprocket 69 on a jack shaft 70. Jack shaft 70 is rotatably supported in suitable bearings on lateral support members depending from frame members 25, 26, and 27. Driving means, such as an electric motor 71, is drivingly connected to shaft 70, such as through a chain drive 72.

Electric motor 71 may be supported on a shelf 73 depending upon frame members 25 and 26.

Figure 9:
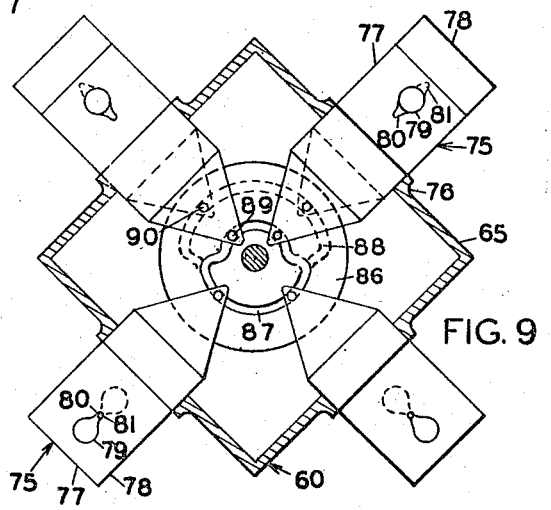
FIG. 9 is a cross-sectional view taken along the line 9—9 of FIG. 2.

At longitudinally equally spaced positions along support member 65 and on each outer face thereof are provided crimping or gathering mechanisms designated generally as 75 (FIG. 9). Each gathering mechanism 75 includes a guide 76 that is fastened to the side of support member 65. Constructed to slide on a perpendicular plane with respect to the longitudinal center axis of support 65, and within guide 76, is a pair of plates 77 and 78. Each plate 77 and 78 is provided with a centrally positioned, substantially circular aperture 79 through which is positioned tubular mold 61. In one plate 77, the aperture 79 is formed with a radially positioned slot 80. Slot 80 is oppositely disposed to a similar slot 81, that is formed from one edge of the aperture 79 in plate 78.

Suitable mechanism is provided within housing 65 for the purpose of moving plates 77 and 78 in opposite radial directions through guide 76 to bring the small ends of slots 80 and 81 to machining positions at the center axis of the flexible mold 61. In this manner moving plates 77 and 78 crimp and gather the flexible tube 61 to a tightly encased position at the position of the gathering mechanism 75.

Figure 11:
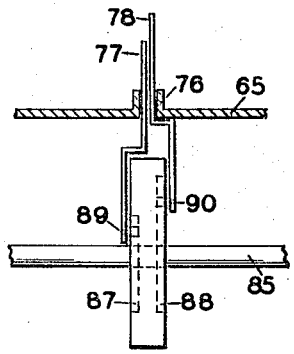
FIG. 11 is a sectional view taken along the line 11—11 of FIG. 3.

A suitable apparatus for operating the gathering mechanisms 75 is shown in FIGS. 9 and 11. A stationary shaft 85 is provided which may be positioned in and held in a hollow center of stub shafts 66. Shaft 85 fixedly supports a cam plate 86 at each gathering position along the length of support member 65. Cam plate 86 is provided on opposite sides with cam grooves 87 and 88 which receive in driving relation cam followers 89 and 90 that are attached to plates 77 and 78, respectively. Cam grooves 87 and 88 are formed so that the rotation of support member 65 causes the followers 89 and 90 to increase their respective distances from the center of shaft 85, which, in turn, moves plates 77 and 78 to either gathered or open position. The form and position of the grooves times the action of the plates 77 and 78 as required in the operation of the mechanism which is described below.

A tank 95 is provided below the rotatable axis of support member 65 and in a position to hold a liquid at a predetermined level. Tank 95 may be supported by brackets 96 that depend from support members 25 and 26. Electrical or other suitable heating elements (not shown) are provided in tank 95 to heat and maintain a liquid therein at a predetermined elevated temperature.

The forming and coagulating portion of the apparatus operates as follows:

A comminuted sausage mixture is loaded into the stuffer 34 through a pressure-retaining opening such as a screw cap 97. Under the regulation of suitable controls, operation of motor 71 causes support member 65 to rotate by means of chain drive 72, shaft 70, and chain drive 68. In the normal procedure, support member 65 is rotated 90 degrees in each operating sequence in the 4-mold machine shown. At the end of each 90 degrees rotation, support member 65 comes to a stop at which time each of the tubular mold members 61 is brought to an operating station, as most clearly seen in FIG. 7. At the operating station for filling, one tubular mold is aligned with stuffing rod 44. When the tube 61 comes to a stop at the filling station, the valve 39 in connection with cylinder 41 is operated to move stuffing rod 44 to the right. Movement of rod 44 to the right extends the end 53 into the tube 61 toward stanchion 63.

Figure 6:
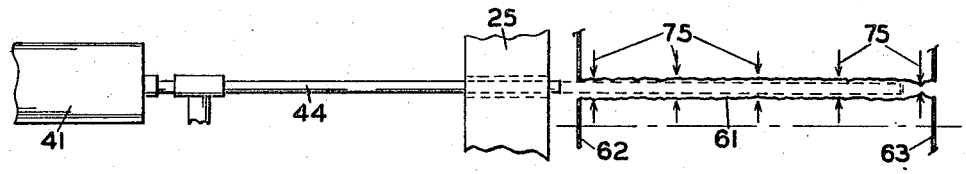
FIG. 6 is a sectional, elevational view of a portion of the apparatus taken along the line 6—6 of FIG. 3.

Simultaneously with the arrival of tube 61 at the filling station, the cam plate 68 having control of the gathering mechanism 75 nearest to stanchion 63, causes that gathering mechanism 75 to move to closed position, as seen in FIG. 6. When end 53 reaches a position adjacent to the gathered end of tube 61 valve 47 is opened and valve 39 is reversed. The action of double-acting cylinder 41 is reversed thereby, and rod 44 retracts. Simultaneously with the retraction of rod 44, valve 48 is opened and the comminuted meat mixture is forced through conduit 49 and the hollow of stuffing rod 44, and is ejected into tubular mold 61. At the proper time, valve 48 closes, allowing the stuffing of meat to stop slightly past that gathering mechanism nearest to stanchion 62. At this time, tube 61 is completely and uniformly filled with comminuted meat at constant pressure.

As soon as the filling operation is completed, the support member 65 rotates 90 degrees on stub shafts 66 and the filled tubular mold 61 is immersed in the liquid in tank 95. The movement of support member 65 with respect to the cam plates 86, which are stationary on stationary shaft 85, causes the gathering mechanisms 75 to close within a few degrees of rotation from the filling station on the way to the first coagulating station, so that, on arrival, the flexible tubular mold 61 has been gathered at each gathering mechanism 75 position, and the comminuted meat mixture within the mold 61 has been separated into discrete sausage portions.

Figures 7, 8:
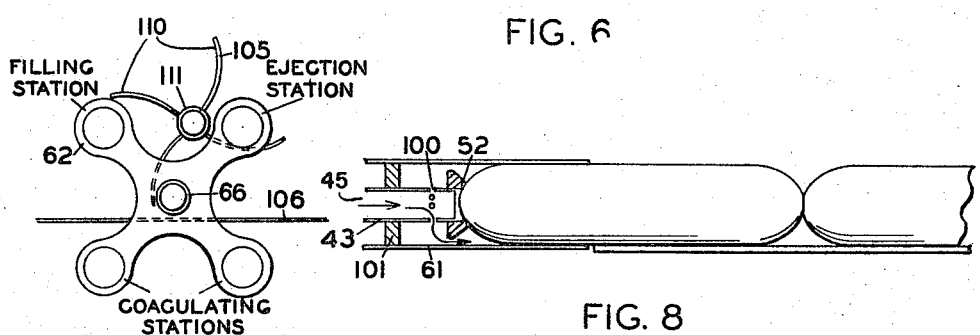
FIG. 7 is a schematic sectional elevational view of a portion of this invention.
FIG. 8 is a sectional elevational view of a tubular mold of this invention with an ejector in operating position therein.

As soon as support member 65 comes to a standstill the filling operation commences again on another flexible tubular mold 61 which has arrived at the filling station. Again as soon as the filling operation is completed the support member 65 indexes in rotation 90 degrees, carrying the first filled tubular mold 61 to the second coagulating position (FIG. 7), the second filled tubular mold 61 to the first coagulating station, and another tubular mold 61 to the filling station. At this time, the previously described filling operation is carried out in the empty tubular mold 61 at the filling station, while the heat from the hot liquid is conducted into the comminuted meat mixture in the previously filled tubular molds 61 at the coagulating stations. At the completion of the third filling operation support member 65 indexes 90 degrees bringing the first filled tubular mold 61 out of the hot liquid to an ejecting station, as seen in FIG. 7. Simultaneously another tubular mold moves into the filling station and previously filled tubular molds 61 are moved in the coagulating stations.

During movement of the tubular mold 61 from the second coagulating station to the ejecting station, the gathering mechanisms 75, that are associated with the tubular mold 61 making this movement, are moved to open position as shown in FIG. 9. When the mechanism 75 is moved to the open position, the flexible tube is released and may return to its tubular form.

As soon as support member 65 stops, valve 47 and the valve 39 in connection with piston 40 are moved to open position causing ejector rod 43 to project leading end 52 into the tubular mold 61 at the ejecting station. The end 52 makes contact with the first formed and coagulated sausage and forces that sausage toward the opposite end of the tube 61. Simultaneously air from conduit 46 and chamber 45 passes out through a plurality of apertures 100 adjacent to the end 52. End 52 is constructed with a maximum diameter slightly less than the internal diameter of the tube 61 so that the air which is admitted from the apertures 100 passes around the circumferential edge and moves between the surface of the sausage and the surface of the tube 61. An additional ring 101 is provided on the ejector rod 43 to prevent the passage of air in the opposite direction. Loosened by the air passing along the sides of the sausages and forced by contact with the end 52, the first sausage moves to the right pressing against the second sausage. All of the sausages in the tube 61 are forced to the right and in this manner they are ejected for further processing, as will be explained below. During ejection the movement of the sausages through the tubular mold 61 forces them back to tubular form at the gathering positions. After the ejector rod 43 completes its travel to the right ejecting all of the sausages, the valve 39 in connection with cylinder 40, reverses. This withdraws piston rod 43 and end 52 from the tubular mold 61 at the ejection station.

At the completion of the ejection and filling operations support member 65 indexes 90 degrees which brings the first tubular mold 61 back to the filling station and the complete manufacturing operation may commence again. Of course, it will be understood that, once a complete manufacturing cycle has been made by the first tubular mold 61, all operations at all stations are carried on simultaneously during the continuous operation of the machine. Suitable conventional controls may be provided to time and interlock all functions of the apparatus so that continuous mass production of sausages may take place without human attention.

The successful operation of the forming and coagulating portion of the apparatus of this invention depends on proper coagulation taking place at the coagulating stations. If sufficient heat for a sufficient length of time is not induced into the meat mixture at the coagulating stations, a clean and successful ejection will not take place. It has been found that by employing hot water at a temperature of about 200° F., sufficient coagulation can be achieved in the skinless frankfurter mix in a matter of 20 seconds total coagulating time. On this basis a preferred timing interval for operating sequences of the apparatus has been established at about 10 seconds. A total time interval of 30 seconds at 180° F. has also proven to be successful.

The coagulation imparted in this process is not uniform throughout the sausage, but is instead a thickening in a layer adjacent to the surface of the sausage. This layer does not have a tough skin formation at the surface. It proceeds inwardly from a soft outer surface in gradually decreasing solidity to the more or less completely mushy center. However, under proper temperature and time conditions, the sausage formations are sufficiently form-sustaining to be carried through the remainder of the process steps.

The successful operation of this portion of the apparatus also depends on the use of tubular molds meeting certain requirements. The tubular molds must be sufficiently flexible to be gathered tightly under pressure and to be released at the same position repetitively, over a prolonged period of time. In addition the material must be tasteless, nontoxic, and nontacky in contact with the meat mixture that is being used. It has been found that polyethylene tubing of a wall of .002 inch may be successfully used in an apparatus constructed according to this invention. Tests on the polyethylene tubular molds have indicated a life greater than the equivalent of one day's continuous operation. This is believed to be sufficient because the tubes are of sufficiently low cost that it would be preferred to discard used tubes at the end of each day's schedule.

Cooking and further processing portion

Referring to FIGS. 2, 3, 4, 5 and 7, the cooking portion of the apparatus of this invention comprises receiver means, such as a dumping trough 105, that is rotatably supported on suitable bearings in support members 31 and 32, and conveyor means arranged to carry discrete formed sausages through a plurality of processing chambers 107, 108, and 109.

Dumping trough 105 includes a plurality of curved flanges 110 centrally connected on a shaft 111. Shaft 111 is supported at opposite ends with suitable bearings in frame members 31 and 32. A chain drive 112 is provided betweeen shaft 70 and shaft 111 so that trough 105 rotates simultaneously with support member 65. An intermediate chute 113 is provided between the end of the tubular mold 61 at the ejection station and one side of trough 105.

As most clearly seen in FIG. 7, when the sausages are ejected at the ejection station, one flange 110 of the dumping trough 105 is positioned to receive the sausages as they are forced by the ejector end 53. After the ejector rod 43 is retracted and when the support member 65 indexes, the dumping trough rotates to deposit the formed sausages on the conveyor 106. The conveyor 106 carries the sausages into the first oven 107 for further processing.

The various conveyors 106 transport the sausages through a plurality of passes into a smokehouse or second processing chamber 108. Other conveyors 106 transport the sausages by multiple passes into the third processing chamber 109 when they are cooled by chilling means, such as cold liquid spraying apparatus 114. Still other conveying apparatus 106 transports the sausages from the third processing chamber 109 to other apparatus for packaging and cold storage.

The successful operation of the cooking portion of the apparatus of this invention again depends on successful processing of the sausages in the forming and coagulating portion. The sausages must be properly formed and sufficiently coagulated when deposited on the dumping trough 105 that they will be of form-sustaining consistency to withstand the multiple handling by the conveyor apparatus. It has been found that the sausages may not remain round in cross section when ejected from the mold 61 onto the dumping trough 105, but instead slump slightly. However, in the further cooking processes they rise to a satisfactory round cross-sectional shape.

Method

Figure 1:
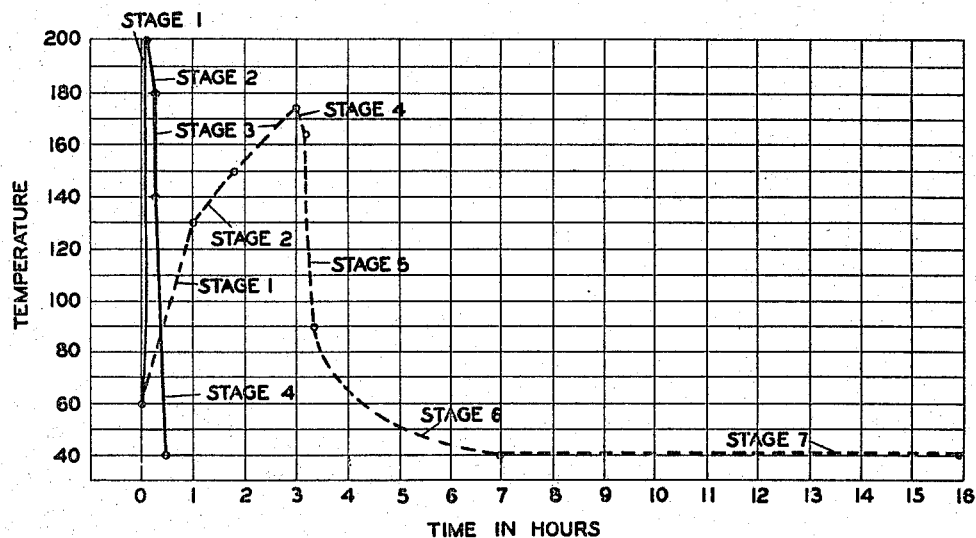
FIG. 1 is a graph showing the time and temperature relationship in a prior art, conventional frankfurter-manufacturing process and in the process of this invention.

The method of this invention is graphically depicted in FIG. 1.

Previous to the commencement of operation, the raw meat products are ground and blended to form the comminuted mixture suitable for the particular sausage to be manufactured. The mixture is placed in the stuffer above the air-operated piston therein. At the time operations starts, the stuffer is connected in the apparatus as previously described.

In the first step of the process at the filling station, the flexible mold 61 is filled in a progressive "lay-down" manner. The term "lay-down" is used to mean that the stuffing piston rod end 53 moves ahead but in close proximity to the mixture as it is deposited. This lay-down technique is advantageous over, and is to be distinguished from, a machine-stuffing process in which an end of a stuffing horn is placed at the entrance to a tubular mold and the material to be stuffed is forced progressively into the mold by the pressure and flow of the material. The lay-down process rolls out entrained air and uneven deposits, preventing the formation of bubbles and providing a uniformly stuffed mold.

In the second step of the process, the reusable flexible mold is gathered by the gathering mechanism 75 in a manner which produces the same result as the tying method of the prior art. The particular shape of the apertures 79 with their oppositely disposed elongated ends 80 and 81, and the disclosed movement thereof, has been found to provide a gathering effect without undue wear on the flexible mold at the gathering position.

In the next step of the process, heat is applied to the mixture while in the flexible mold and while separated into discrete sausage portions. In the apparatus described above, a hot liquid is employed to enclose the mold and conduct heat to the sausage mixture within. However, alternatively, other heating methods could be used, such as electrical resistance, infrared, as the situation dictates. In the operation of the method of this invention, it has been found that a skinless frankfurter mix formed into sausages of the usual well-known frankfurter size and shape may be heated to a temperature of about 200° F. by submersion in a liquid at about 200° F. and that the mixture may be coagulated sufficiently to a form-sustaining consistency under these conditions in a period of 20 seconds. FIG. 1 depicts time on the abscissa in hours. As shown in FIG. 1, the forming and coagulating stages of the process in which the temperature of the mixture arises from an ambient 62° F. to about 200° F. at the surface, is a minor portion of the cycle.

In the next process step, the mold is released at its gathered positions by the opening of the gathering apparatus 75.

Following this, the discrete sausage formations are ejected from the mold by the ejector rod end 52.

After being conveyed to the first processing chamber 107, which is an oven, cooking commences. The first stage of cooking in oven 107 is carried out in a humid atmosphere. Temperature in the oven is maintained at about 180° F. and steam is admitted to maintain a high humidity. It has been found that frankfurter sausages may be rapidly cooked in a humid atmosphere of about 70 percent relative humidity for a period of about 10 to 20 minutes. This is sufficient to raise the internal temperature to 155° F. The surface temperature of the sausages is about 200° F. on entering the oven but is reduced to 180° F. during a period of less than 15 minutes in the oven. Because the sausages are being cooked without skins and without a casing, the rapid cooking effect of the highly humid atmosphere may be obtained.

In the continuous process depicted in FIG. 5, the sausages are conveyed in the next step to a smoke oven 108 which is maintained at a temperature of about 140° F. In this oven 108, the atmosphere is charged with smoke and no artificial humidifying effect is created. The relative humidity has been found to be about 25 to 30 percent under the usual conditions during this stage. As seen in FIG. 1, the stage 3 smoking portion of the process is preferably carried out for about 10 minutes or less as the temperature in the sausages is reduced. It has been found that because the sausages have been cooked at high humidity, their outer surfaces are relatively soft and this facilitates the absorption of smoke which produces the desirable smoke flavor in a very short period of time at lower than conventional smoke density in the oven. Since the sausages are not being processed in a casing, the absorption of smoke is additionally facilitated. Smoking is a drying process so, therefore, the sausages are provided with some crust or skin during the stage 3 operation.

Due to the fact that the cooking times involved in this process are very short, it has been found advantageous to add ¾ of an ounce ascorbic acid to each 100 pounds of sausage mixture to develop satisfactory color in the sausage. The consumer is accustomed to sausages of a certain color and although the sausages are sufficiently cooked, without the "proper" color they are not acceptable. The longer processing time of the prior art develops the color without additives in many cases.

Referring to FIG. 1 and FIG. 5 in cooling stage 4 the sausages are transmitted by the conveyor 106 to processing chamber 109 where the sausages are reduced in temperature rapidly from about 140° F. to about 40° F. by chilling with means such as cold water sprays 114. This cooling operation is carried on with the cooling medium at a temperature sufficiently low to reduce the sausage to a storage temperature of 40° F. in a period of about 5 minutes. If necessary, additives such as glycerin may be used as a cooling liquid when necessary to allow operation at lower coolant temperature.

It has been found in some instances that it is desirable to reduce the space between the lower face of the upper conveyor 106 and the upper face of the lower conveyor 106 so that both of these surfaces contact the sausages during the cooling operation. When this is done and the upper and lower conveyors are operated at different speeds, the sausages between are rolled along these surfaces. The rolling operation on the outer surfaces of the sausages while cooling tends to provide a smooth surface to the outside of the sausages.

Figure 10:
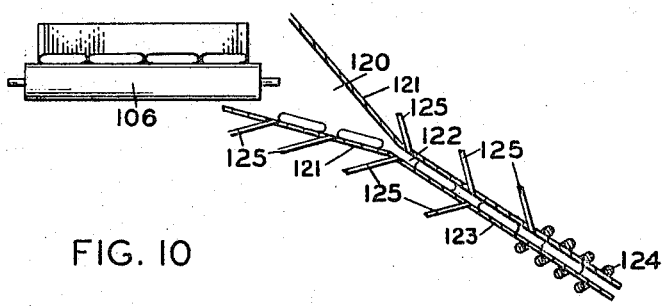
FIG. 10 is a sectional, elevational view of apparatus for carrying out an alternate method of chilling and sizing sausages, which may be employed in this invention.

In the alternative, the sausage may be cooled in an apparatus as shown in FIG. 10. In this apparatus the sausages are deflected from the conveyor 106 into the throat 120 of a convergent portion 121 of a tubular chute 122. Tubular chute 122 comprises the convergent portion 121 and a portion 123 of constant diameter. The diameter of portion 123 is the same as that desired for the finished sausage product. The inside surface of the tube is polished to a high degree so that the sausages may enter the throat and be conveyed downward into the constant-diameter portion 123 where they are sized. Tubular chute 122 is provided with circumscribing refrigeration coils 124 and with cold compressed air jets 125 at suitable intervals along its length. Air is admitted to the jets 125 to provide impetus to the sausages and to convey the sausages downward and through the cooling chute 122. The temperature of the air admitted through the jets 125 is maintained at a low value. The temperature of the chute 122 is also maintained at a low value by the cooling coils 124. During the time that the sausages progress through the chute 122, they are reduced in temperature and at the same time are properly sized and provided with an attractive smooth surface.

FIG. 1 shows the advantages to be found in the process of this invention over that of the conventional methods. Conventional methods require approximately sixteen hours from the time that the sausage mix is stuffed until the time that the casings are removed and the sausages may be considered to be finished. In contrast, the process of this invention requires about one-half hour or less to complete. While the precise reasons why the process of this invention produces completely cooked and satisfactory sausages in such a reduced interval are now known, it is believed that the use of high humidity during the second stage of the cooking process contributes greatly to the success of the process. The use of the high humidity in stage 2 greatly increases the amount of heat conduction into the sausages as well as keeping the surface soft. In the third stage, due to the fact that the sausages have a soft, tender outer surface, smoke is absorbed quickly.

It will be appreciated that the time intervals represented for the process of this invention may be varied within reasonable limits of perhaps one magnitude and the process can probably be successful to some advantage. The intervals represented in FIG. 1 are the preferred criteria for the operation of the process. Naturally, in many situations, such as in cooking, the same step over a longer period of time at a reduced temperature may be effective. However, this should not detract from the significance of this invention because of the magnitude of time saving involved and because of the conditions, such as humidity, existent in the process of this invention that are not found in conventional practice.

Another important advantage to be found in the process of this invention lies in the reduction in the time that the sausages are at a temperature conducive to internal bacteria growth. During the processing of meat products, as the temperature of the meat is raised to between 90 and 110° F. bacteria growth becomes very rapid. It is therefore considered an advantage to maintain bacteria growth at a minimum by passing through this range very rapidly.

It will be understood, of course, that, while the forms of the invention herein shown and described constitute the preferred embodiments of the invention, it is not intended herein to illustrate all the possible equivalent forms or ramifications of the invention. It will also be understood that the words used are words of description rather than limitation and that various changes, such as changes in shape, relative size, and arrangement of parts may be substituted without departing from the spirit or the scope of the invention herein disclosed.

What is claimed is:

1. The method of manufacturing sausages from a comminuted mixture containing meat, comprising: forming and coagulating said mixture into at least one predetermined sausage formation by the application of heat to thicken said mixture in a layer adjacent to the surface of said formation; cooking said at least one formed and coagulated sausage in a humid atmosphere of about 70 percent relative humidity at a temperature of about 180° F. for a period of 10 to 20 minutes; smoking said at least one formed and coagulated sausage in a smoke-laden atmosphere with a relative humidity of about 25 percent at a temperature of about 140° F. during a period of about 10 minutes; and cooling said sausages to a temperature of about 40° F.

2. The method of manufacturing sausages from a comminuted mixture containing meat, comprising: forming and coagulating said mixture into at least one predetermined sausage formation by the application of heat to said mixture at a temperature of about 180° F. to 200° F. for a period of about 10 to 20 seconds; cooking and smoking said at least one formed and coagulated sausage in a smoke-laden atmosphere, beginning at a relative humidity of about 70 percent at about 180° F. for a period of about 10 to 20 minutes and terminating with a relative humidity of about 25 percent at a temperature of about 140° F. for about 10 minutes; and cooling said at least one sausage to a chilled storage temperature of about 40° F.

3. The process of manufacturing sausages according to claim 2, wherein said sausages are cooled by means of a liquid spray contacting the surface of said at least one sausage directly.

4. The method of manufacturing sausages from a comminuted mixture containing meat, comprising: forming and coagulating said mixture into a plurality of discrete sausage products by the applications of heat at the surface of the sausage products by means of an ambient temperature condition of between about 180° F. and 200° F. for a period of about 10 to 20 seconds while confining the sausage products to a cylindrical shape; cooking said sausage products in a humid atmosphere of about 70 percent relative humidity at a temperature of about 180° F. for a period of 10 to 20 minutes; smoking said sausage products in a smoke-laden atmosphere with a relative humidity of about 25 percent at a temperature of about 140° F. during a period of about 10 minutes; cooling said sausages to a temperature of about 40° F.; rolling said sausages during at least one of said cooking, smoking, and chilling steps for imparting a smooth surface to the outside said sausages; and, completing the manufacturing process in a total manufacturing time of less than one-half hour.

5. The method of manufacturing sausages from a comminuted mixture containing meat, comprising: forming and coagulating said mixture into a plurality of discrete sausage products by the applications of heat at the surface of the sausage products by means of an ambient temperature condition of between about 180° F. and 200° F. for a period of about 10 to 20 seconds while confining the sausage products to a cylindrical shape; cooking said sausage products in a humid atmosphere of about 70 percent relative humidity at a temperature of about 180° F. for a period of 10 to 20 minutes; smoking said sausage products in a smoke-laden atmosphere with a relative humidity of about 25 percent at a temperature of about 140° F. during a period of about 10 minutes; passing said sausages through a taper in the direction of gradual diminution in size to impart a smooth surface to the outside of said sausages; cooling said sausages to a temperature of about 40° F.; and completing the manufacturing process within a total manufacturing time of less than one-half hour.

References Cited in the file of this patent

UNITED STATES PATENTS

| | | |
|---|---|---|
| 1,009,953 | Boyle | Nov. 28, 1911 |
| 1,825,528 | Knudsen | Sept. 29, 1931 |
| 2,182,211 | Paddock | Dec. 5, 1939 |
| 2,623,451 | Prohaska | Dec. 30, 1952 |
| 2,685,518 | Prohaska | Aug. 3, 1954 |